Aug. 28, 1956  K. H. HACHMUTH  2,760,352
FRACTIONATION OF GASES
Filed Nov. 9, 1951
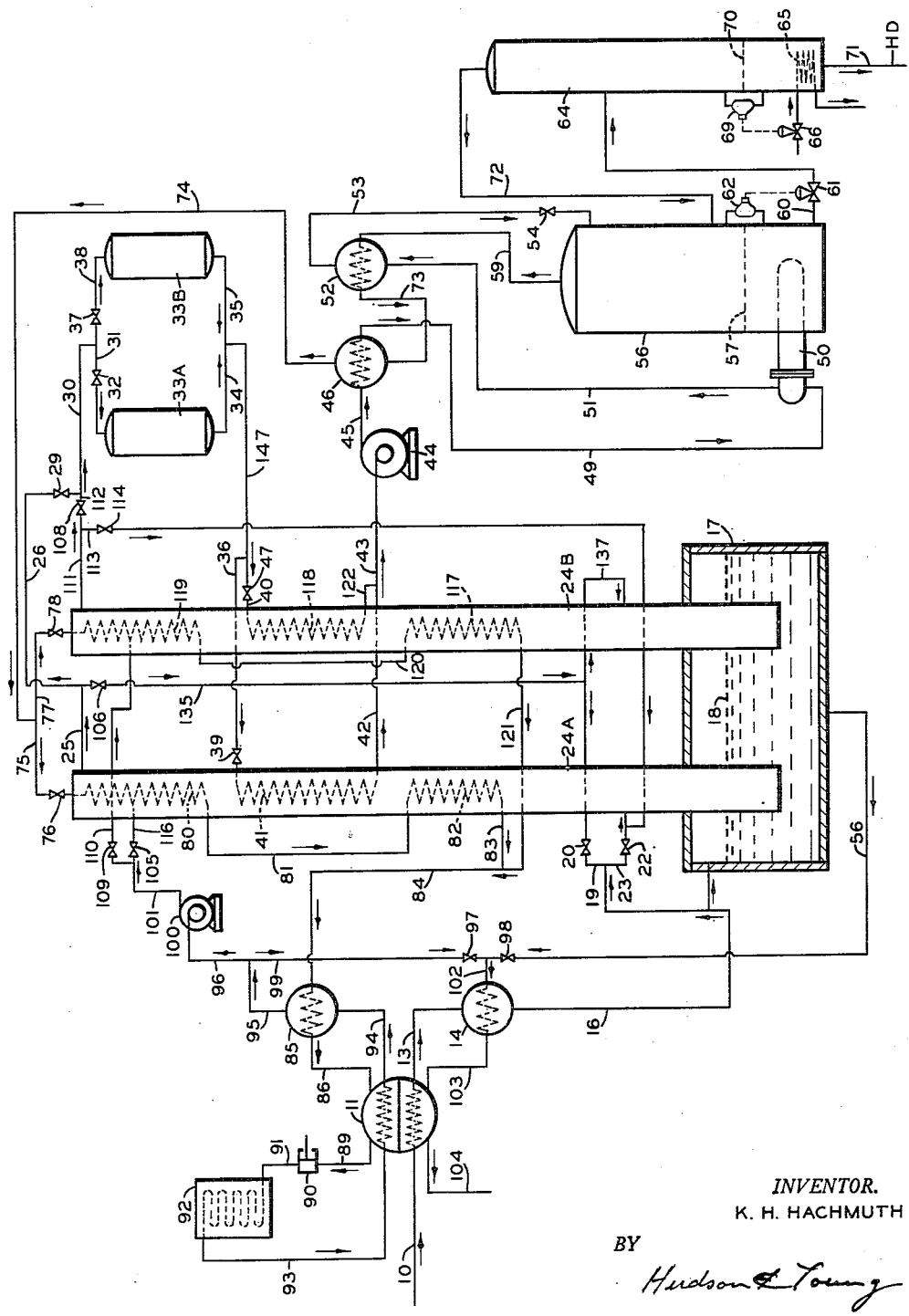
INVENTOR.
K. H. HACHMUTH
BY
Hudson & Young
ATTORNEYS much# 2,760,352

FRACTIONATION OF GASES

Karl H. Hachmuth, Bartlesville, Okla., assignor to Phillips Petroleum Company, a corporation of Delaware Application November 9, 1951, Serial No. 255,680

10 Claims. (Cl. 62—122)

This invention relates to a process and apparatus for the resolution of gaseous mixtures into component parts. In one of its more specific aspects it relates to a process for the separation of a mixture of nitrogen and hydrogen into a substantially pure nitrogen stream and a substantially pure hydrogen stream and includes correlated improvements and discoveries whereby the concentration and separation of a hydrogen isotope is achieved. In another of its more specific aspects it relates to a process whereby a gaseous mixture of nitrogen and hydrogen such as an ammonia synthesis gas, is processed to recover a substantial portion of the deuterium hydride therein as well as to recover as effluent a gaseous mixture comprising nitrogen and hydrogen suitable for use in a process for the production of ammonia.

The existence of the three isotopes of hydrogen has been known for some time. The isotopes of hydrogen are known as hydrogen, deuterium and tritium. Various methods known to the prior art have been employed to achieve separation of deuterium from a gaseous mixture of hydrogen and particularly for the recovery of deuterium in the form of heavy water by a controlled fractionation of water. Recovery of deuterium has also been practiced by electrolysis of water. These methods are however all difficult, time-consuming and expensive. Recent developments have indicated an increased need for deuterium either in the form of a gas or combined with oxygen in the form of heavy water. It is well known that heavy water containing deuterium as a component thereof can be used as a modifier for the production of thermal or so-called slow neutrons.

It is an object of this invention to provide a process wherein deuterium normally present in an ammonia synthesis gas comprising nitrogen and hydrogen may be efficiently and expeditiously recovered. It is another object of this invention to provide a process for the recovery of deuterium in the form deuterium hydride by a readily applicable method. It is also an object of this invention to provide an apparatus suitable for effecting separation of gaseous mixtures such as nitrogen and hydrogen or an ammonia synthesis gas comprising nitrogen and hydrogen into component parts and at the same time advantageously separating as product a deuterium hydride concentrate.

Other objects and advantages of the invention will become apparent and be better understood with reference to the accompanying disclosure and the accompanying diagrammatic drawing which illustrates an apparatus for the practice of the invention.

In accordance with the present invention a gaseous mixture of nitrogen and hydrogen is compressed and cooled and passed to a fractionator wherein a gaseous hydrogen stream is taken overhead and a liquid nitrogen stream is recovered from the bottom. The overhead gaseous hydrogen stream is further cooled and passed to concentrators from which a product stream comprising deuterium hydride is removed from the bottom thereof and the gaseous hydrogen stream from the top of a concentrator is recycled in heat exchange relationships with certain streams of the process and admixed with said liquid nitrogen stream from said fractionator, the resulting liquid nitrogen-gaseous hydrogen admixture being recovered after suitable heat exchange as an effluent of the process. This gaseous effluent is suitable for use in an ammonia synthesis process.

More particularly stated the present invention provides a process wherein a gaseous mixture containing nitrogen and hydrogen, such as an ammonia synthesis gas, is compressed and cooled and passed to a fractionator wherein a gaseous hydrogen stream is taken overhead and a liquid nitrogen stream is removed from the bottom of the fractionator. The overhead gaseous hydrogen stream is then passed in indirect heat exchange relationship with the gaseous mixture comprising nitrogen and hydrogen to be separated within said fractionator in order to further improve and effect the separation thereof. This gaseous hydrogen stream after heat exchange with the gaseous mixture within the fractionator is further cooled, as by passing through an expansion engine and is then passed, after further cooling, into a concentrator. The cooled hydrogen stream is fractionated within a first concentrator to produce overhead a gaseous hydrogen stream and to recover from the bottom thereof a deuterium hydride concentrate. This deuterium hydride concentrate is further concentrated in a second concentrator from the bottom of which a product comprising deuterium hydride is recovered. The gaseous overhead hydrogen stream from said first concentrator is passed in indirect overhead heat exchange relationship with the gaseous hydrogen feed to said first concentrator and is then passed in indirect heat exchange relationship with the gaseous mixture to be separated within the hydrogen-nitrogen fractionator. This gaseous hydrogen stream is then after other suitable heat exchange recompressed, cooled and admixed with the liquid nitrogen stream from the nitrogen-hydrogen fractionator. A portion of this cooled compressed hydrogen stream is further cooled by expansion to a substantially lower pressure and is then employed as a coolant in the nitrogen-hydrogen fractionator. The resulting admixture comprising gaseous hydrogen and liquid nitrogen is then passed in heat exchange relationship with various streams such as with a gaseous nitrogen-hydrogen mixture employed as feed for the nitrogen-hydrogen fractionator. A particularly noteworthy feature of this invention is that the nitrogen-hydrogen effluent obtained by admixing the liquid nitrogen stream from the fractionator with the gaseous hydrogen stream from the concentrator is recovered at a substantial pressure, between about 250 and 350 pounds per square inch absolute (p. s. i. a.) usually about 275 p. s. i. a. In this way the required refrigeration is obtained by the evaporation of liquid nitrogen at a much higher total pressure (nitrogen partial pressure plus hydrogen partial pressure) than would be possible if the same amount of refrigeration were to be obtained by the evaporation of nitrogen in the absence of hydrogen. This results in an important saving in power requirements, since the gas then requires only a moderate increase in pressure (e. g., from 275 p. s. i. a. to 375 p. s. i. a.) to return it to an ammonia synthesis system at a pressure at which the ammonia synthesis reaction may be carried out. Another noteworthy feature of this invention is the employment of a cool, gaseous overhead stream from the fractionator as an intermediate cooling or dephlegmating agent from the nitrogen-hydrogen mixture to be fractionated within the fractionator.

As a result of this above-indicated operations a gaseous mixture of nitrogen and hydrogen is fractionated and processed to recover therefrom a deuterium hydride concentrate containing between about 25 and about 40, usually about 35, per cent of the available deuterium present in the hydrogen stream processed. The deuterium recovered from the nitrogen-hydrogen mixture is in the form deuterium hydride (HD) and is recovered at a concentration of about 50% by volume, the remainder being hydrogen ($H_2$). A substantial amount of deuterium ($D_2$) is also recovered from the amount available.

The invention will be further described in connection with the accompanying drawing which is a schematic presentation of one form of an apparatus in which the process of the invention may be carried out. Referring now to the accompanying drawing wherein a gaseous mixture of nitrogen and hydrogen in a weight range ratio of between 3.5:1 and 5.5:1, preferably in a weight ratio of about 4.64:1 nitrogen to hydrogen and at normal atmospheric temperature preferably about 80° F. and at a pressure of between about 250 and 500, preferably 375 p. s. i. a., for example, at a rate of about 14 tons per hour nitrogen and 3 tons per hour hydrogen, is passed via line 10 to heat exchanger 11 wherein the temperature of the gaseous mixture is substantially reduced, usually to about 91.8° K. and from which it is then passed via line 13 into heat exchanger 14 wherein it is cooled to about 70° K.

The mixture of nitrogen and hydrogen leaves heat exchanger 14 via line 16 and enters nitrogen-hydrogen fractionator 24A via line 23, valve 22 in line 23 being open and valve 20 in line 19 being closed. A second nitrogen-hydrogen fractionator 24B is provided so that the hydrogen deuteride recovery can be carried out continuously. A pair of nitrogen-hydrogen fractionators 24A and 24B is provided so that when one feed fractionator, for example 24A, becomes inoperative due to the accumulation of solid nitrogen therein, fractionation can be carried out in another feed fractionator, for example 24B, while the other fractionator is being thawed out i. e., solid being removed. Advantageously the gaseous mixture of nitrogen and hydrogen to be separated may be employed to thaw out a fractionator containing solid nitrogen by connecting the feed fractionators in series. At the same time the gaseous mixture of nitrogen and hydrogen will be precooled prior to admittance into the operating feed fractionator.

Feed fractionators 24A and 24B are shown located within vessel 17 wherein a liquid nitrogen seal is maintained for fractionators 24A and 24B. The surface of the liquid nitrogen is indicated at 18.

The mixture of nitrogen and hydrogen is fractionated within feed fractionator 24A to produce overhead therefrom via line 25 a relatively pure hydrogen stream containing a small amount of nitrogen and from the bottom of vessel 17 is drawn off a stream of liquid nitrogen via line 56 at a temperature of about 70° K. and at a pressure of about 350 p. s. i. a. The temperature of the liquid nitrogen in the bottom portion of feed fractionator 24A and recovered from vessel 17 should not be below 63° K. and preferably not above 77° K. The liquid nitrogen is recovered from vessel 17 at a rate of about 14 tons per hour and contains about 84 lbs. of hydrogen.

The gaseous hydrogen leaves feed fractionator 24A overhead via line 25 and passes via lines 26, 30 and 31 into absorber 33A, valve 29 in line 26 and valve 32 in line 31 being open and valve 108 in line 112 and valve 37 in line 38 being closed. Absorbers 33A and 33B contain charcoal or other suitable absorbent material for removing the small amount of nitrogen present in the hydrogen stream from the feed fractionator. Furthermore valve 106 in line 135 is closed.

The hydrogen stream, now substantially free of nitrogen leaves absorber 33A via 34 and passes via lines 147 and 36, valve 39 in line 36 being open and valve 47 in line 40 being closed, into heat exchanger 41 located in an intermediate section of feed fractionator 24A. Thus the relatively cool hydrogen is passed in indirect heat exchange relationship with the mixture of hydrogen and nitrogen within 24A. Heat exchange means 41 serves to achieve a better separation of the gaseous mixture of nitrogen and hydrogen within feed fractionator 24A. Thus, it should be observed that the gaseous overhead fraction from fractionator 24A is employed to obtain a better fractionation and separation of the hydrogen and nitrogen within fractionator 24A by utilizing this overhead fraction to condense and separate the less volatile nitrogen from the hydrogen. At this point it is also pointed out that the fractionation of nitrogen and hydrogen within fractionator 24A is also aided and achieved by heat exchange means 80 and 82 located in the upper and lower sections of fractionator respectively.

The gaseous hydrogen leaves heat exchanger 41 via line 42 at a temperature of about 53° K. and at a pressure of about 350 p. s. i. a. and passes via line 43 into a cooling device such as expansion engine 44. In expansion engine (turbine) 44 the hydrogen is expanded and cooled and the resulting hydrogen effluent emerges via line 45 at a temeprature of about 31° K. and at a pressure of about 67 p. s. i. a. The hydrogen effluent then enters heat exchanger 46 and emerges therefrom at a temperature of about 28° K. via line 49 from which it passes into heat exchanger (reboiler) 50 located in the lower section of first concentrator 56 wherein the gaseous hydrogen is liquefied. From heat exchanger 50 the liquid hydrogen passes via line 51 into heat exchanger 52 wherein it is cooled to about 25° K. and then via line 53 through expansion means 54, such as a valve, into first concentrator 56. The hydrogen enters concentrator 56 at about 21.7° K. and at about 22 p. s. i. a. It should be noted that the hydrogen enters into the upper section of concentrator 56.

Within concentrator 56 the hydrogen feed which comprises hydrogen and deuterium hydride is fractionated. The more volatile hydrogen ($H_2$) is removed overhead via line 59 at about 21.7° K. The less volatile deuterium hydride concentrates in the lower section of concentrator 56. A body or reservoir of liquid hydrogen is maintained in the lower section of concentrator 56; the surface of the liquid hydrogen is generally indicated at 57 and the body of the liquid is about 25.1° K. and contains about 4% deuterium hydride.

Liquid hydrogen flows from first concentrator 56 via line 60 through valve 61 which is operatively connected to the hydrogen liquid level controller 62, into second concentrator 64, where it is subjected to further fractionation.

The overhead fraction from second concentrator 64 consisting primarily of hydrogen ($H_2$) returns to first concentrator via line 72. Heat is applied to the lower section of concentrator 64 by heat exchange means 65. The amount of heat being supplied to the liquid hydrogen in the bottom of concentrator 64, is regulated by controlling the amount of heat exchange fluid passing into heat exchangers 65 via valve 66 which is operatively connected to liquid level controller 69. The liquid hydrogen level is generally indicated at 70. Deuterium hydride product comprising about 50 mol per cent deuterium hydride is recovered from concentrator 64 via line 71 at a rate of about 176 standard cubic feet deuterium hydride per hour. It is pointed out that in concentrator 56 employed for the initial concentration of deuterium hydride from hydrogen, a number of plates or stages equivalent to 50 equilibrium steps is required to yield a bottom fraction containing about 4 mol per cent deuterium hydride. In second concentrator 64 a number of plates or stages equivalent to 35 equilibrium steps is required to yield a bottoms product containing 50 mol per cent deuterium hydride.

The gaseous hydrogen overhead from concentrator 56, now having a substantially reduced deuterium hydride content and at about 21.7° K. passes via line 59 into heat exchanger 52 where it is passed in countercurrent indirect heat exchange relationship with the liquid hydrogen feed to concentrator 56. The deuterium hydride lean hydrogen emerges from heat exchanger 52 via line 73 at about 25° K. and then enters heat exchanger 46. Within heat exchanger 46 the deuterium lean hydrogen gas is passed in countercurrent indirect heat exchange relationship with the cooled, expanded gases from expansion engine 44. Suitable capacities for heat exchangers 52 and 46 are about 6,000 and 8,000 B. t. u./hr./ton nitrogen feed entering the process via line 10 respectively. From heat exchanger 46 the deuterium lean gaseous hydrogen passes via lines 74 and 75 into heat exchange means 80 located in the upper section of fractionator 24A, valve 76 in line 75 being open and valve 78 in line 77 being closed.

Heat exchange means 80 serves as a dephlegmator whereby the less volatile nitrogen within fractionator 24A is cooled, condensed, liquefied and solidified, thereby removing substantially all of the nitrogen from the gaseous overhead effluent from fractionator 24A. The upper section of fractionator 24A is at a temperature of about 41° K. The HD lean gaseous hydrogen emerges from heat exchanger 80 at about 44.5° K. and passes via line 81 into heat exchanger 82 located in the lower section of fractionator 24A. Heat exchangers 82, 80 and 41 act as differential condensers and serve to accomplish the separation of the less volatile nitrogen from the more volatile hydrogen and accordingly should have sufficient heat exchange capacity to condense substantially all the gaseous nitrogen within fractionator 24A. Suitable capacities would be about 40,000 and 30,000 and 45,000 B. t. u./hr./ton nitrogen feed to the process, respectively. The intermediate section of fractionator 24A wherein heat exchanger 41 is located is at a temperature range varying from about 58° K. to about 48° K.

The HD lean hydrogen stream leaves heat exchanger 82 via line 83 at about 65° K. and then passes via line 84 into heat exchanger 85. A suitable capacity for heat exchanger 85 is about 40,000 B. t. u./hr./ton nitrogen process feed. The HD lean hydrogen leaves heat exchanger 85 at about 86.2° K. via line 86 and then enters heat exchanger 11 from which it emerges via line 89 at about 60° F. and at about 15 p. s. i. a. The gaseous stream in line 89 is compressed in compressor 90 and passes via line 91 into cooler 92 from which it emerges at about 80° F. and at about 325 p. s. i. a. via line 93. From line 93 the recompressed HD lean hydrogen gas enters heat exchanger 11 wherein it is passed in countercurrent indirect heat exchange relationship with the uncompressed, relatively cool hydrogen gas in line 86. The compressed HD lean hydrogen gas leaves heat exchanger 11 via line 94 at about 91.8° K. and enters heat exchanger 85 wherein it is passed in indirect heat exchange relationship with the gaseous stream entering via line 84. The compressed HD lean gas leaves heat exchanger 85 via line 95 at about 73.5° K. and a portion thereof passes via line 96 into expansion engine (turbine) 100 and the remainder passes via line 99 through expansion device 97 such as a valve. The portion of the HD lean hydrogen gas which enters expansion engine 100 emerges via line 101 at about 35° K. and at about 20 p. s. i. a. and then passes via line 116 into heat exchanger 80 wherein it serves to provide the necessary cooling and refrigeration required to remove substantially all of the 24A via line 25; valve 105 in line 116 being open and valve 109 in line 110 being closed.

The remainder of the HD lean hydrogen gas which passes via line 99 through expansion means 97 is commingled with the liquid nitrogen which is withdrawn from vessel 17 via line 56 through expansion device 98. The commingled streams of gaseous hydrogen and liquid nitrogen enter heat exchanger 14 via line 102 at about 67.1° K. and about 275 p. s. i. a. and emerges therefrom via line 103 at about 89.4° K. Within heat exchanger 14 the commingled streams of hydrogen and nitrogen are passed in countercurrent indirect heat exchange relationship with the nitrogen-hydrogen process feed stream entering heat exchanger 14 via line 13. The resulting commingled stream of nitrogen and hydrogen leaves heat exchanger 14 via line 103 and enters heat exchanger 11 from which it emerges via line 104 at about 60° F. and about 275 p. s. i. a. and from which it may be supplied directly to an ammonia synthesis process if desired. A suitable capacity for heat exchange means 14 is about 171,150 B. t. u./hr./ton nitrogen process feed.

The total amount of hydrogen and nitrogen recovered via line 104 is substantially the same as the amount of nitrogen and hydrogen in the feed via line 10 to the above described process. Heat exchanger 11 may be of any suitable design and if desired may be made up of two separate heat exchangers. Thus, if two separate heat exchangers are employed in place of heat exchanger 11, one heat exchanger could be devoted to heat exchange between the uncompressed and the compressed hydrogen effluent streams admitted into heat exchanger 11 via lines 86 and 93 respectively, and the other heat exchanger could effect heat exchange between the process streams entering heat exchanger 11 via lines 10 and 103. In accordance with the above-described process a suitable total capacity for heat exchanger would be about 1,711,500 B. t. u./hr./ton nitrogen process feed.

Heat exchange means 11 may also comprise in a section thereof a reversing heat exchanger which can be used to remove carbon dioxide and water vapor from the incoming nitrogen-hydrogen process feed. It is preferred however, that the incoming nitrogen-hydrogen process feed be substantially free of carbon dioxide and water vapor. This may be achieved by well known chemical and/or mechanical methods as by refrigeration. Similarly the incoming process feed should be free of carbon monoxide. Carbon monoxide removal from the incoming nitrogen-hydrogen process feed may also be effected by suitable, well known chemical methods. Any carbon monoxide not removed from the feed will be concentrated in and carried out with the liquid nitrogen stream from vessel 17. Furthermore it is preferred that the nitrogen-hydrogen feed be free of methane. Helium which may be present in very small amounts in the nitrogen-hydrogen feed has little effect upon the process and will be concentrated in the overhead gaseous hydrogen effluent from fractionator 24A. Similarly the small amount of neon which may be present in the feed gases will be of no consequence and will be concentrated in the deuterium hydride product stream from concentrator 64.

A considerable amount of liquid nitrogen containing dissolved hydrogen forms in fractionator 24A. However the freezing point of nitrogen will not be depressed enough by the hydrogen in solution to prevent an accumulation of solid nitrogen in fractionator 24A, particularly on the cooling surfaces of heat exchangers 80, 41 and 82. Therefore after a period of operation it is necessary to remove the accumulated solid nitrogen in order to keep the fractionator operable. The removal of the solid nitrogen from fractionator 24A can be accomplished by warming up this unit and melting away the solid nitrogen. Accordingly, as indicated in the accompanying drawing, in order that the above described process be operated continuously, two fractionators 24A and 24B are provided so that one may be thawed out while the other cools the nitrogen-hydrogen process gas for the separation of nitrogen therefrom.

In view of the above, when fractionator 24A builds up an accumulation of too much solid nitrogen, as evidence by an increase in temperature of the overhead effluent therefrom the nitrogen-hydrogen feed enters fractionator 24A via line 23 and valve 22 (valve 20 in line 19 being closed) passes up through fractionator 24A, leaves via line 25 and passes via lines 135 and 137 (valve 106 being open and valve 29 in line 26 being closed)

into fractionator 24B. Fractionator 24B is brought into service by opening valves 78, 108, 37, 47, 109 in lines 77, 112, 38, 147 and 110 respectively, and closing valves 105, 76, 29, 114 and 39 in lines 116, 75, 26, 113 and 36 respectively. The heat exchangers 117, 118 and 119 within fractionator 24A correspond to and have the same function as heat exchangers 82, 41 and 80, all located within fractionator 24A, respectively, line 120 connects heat exchangers 117 and 119 and line 121 connects heat exchanger 117 with line 84. Thus, the overhead gaseous hydrogen effluent from fractionator 24B leaves via line 111 and passes via lines 112, 30 and 38, valve 37 now being open and valve 32 in line 31 being closed, into absorber 33B wherein nitrogen is removed from the gaseous hydrogen. The nitrogen free hydrogen leaves adsorber 33B via line 35 and passes via lines 147 and 40, valve 47 being open and valve 39 in line 36 being closed, into heat exchanger 118. After fractionator 24A is thawed out and fractionator 24B is in service valves 22 and 106 in lines 23 and 135 are closed and valve 20 in line 19 is opened to allow the nitrogen-hydrogen process feed gas to enter fractionator directly. In a similar manner as is obvious from the accompanying drawing and the above description, fractionator 24B can be thawed out when too much solid nitrogen accumulates therein and fractionator 24A placed in service similarly. It is pointed out that in plant operation adsorbers 33A and 33B are interchanged independently of fractionators 24A and 24B.

With reference to absorbers 33A and 33B one absorber will be in service while the other is being regenerated or is idle pending being put in operation. Regeneration can be accomplished by warming with recycle hydrogen gas until its nitrogen is desorbed and then cooling with recycle hydrogen, employing progressively cooler hydrogen streams until the regenerator reaches operating temperatures at which it can be held in standby condition. Use of adsorbers 33A or 33B in the process stream will smooth out temperature surges, particularly during switching the process gas flow to another fractionator. Also, the main reboiler heat exchanger 50 in concentrator 56 will complete the smoothing out because of the inertia effect of the relatively large amount of liquid hydrogen in bottom of concentrator 56.

Thus according to the invention and as described with reference to the accompanying drawing a gaseous nitrogen-hydrogen mixture is fractionated to produce overhead a gaseous hydrogen fraction substantially free of nitrogen and a bottoms fraction comprising a liquid nitrogen stream containing a small amount of hydrogen. The overhead hydrogen fraction is then subjected to fractionation at a reduced temperature and pressure to produce a bottoms fraction of deuterium hydride and an overhead gaseous fraction having a substantially reduced deuterium hydride content. The deuterium hydride fraction is recovered as product and the overhead gaseous hydrogen fraction is utilized to cool the incoming feed to the nitrogen-hydrogen fractionating zone and the incoming hydrogen feed to the deuterium hydride first concentration zone; and at the same time this same hydrogen stream, having a substantially reduced deuterium hydride content, is employed to effect the separation of nitrogen and hydrogen in the fractionation zone as well as to cool this same stream after compression, to a temperature suitable for admixture with the liquid nitrogen bottoms from the fractionation zone. The resulting cool liquid nitrogen and gaseous hydrogen effluent admixture is then employed to cool the incoming gaseous nitrogen-hydrogen feed to the nitrogen-hydrogen fractionation zone. It is obvious from the above described description that a useful, commercial, economically attractive process is provided for the separation of deuterium hydride from the hydrogen contained in an ammonia synthesis gas.

Although I have set forth my invention with reference to one embodiment as applied to the separation of a nitrogen-hydrogen gaseous stream suitable for use in an ammonia synthesis operation under certain conditions of feed rates, it is to be understood that the particular feed rates set forth in the above described embodiment with reference to the accompanying drawing are typical and should not be considered limitive of the invention. Accordingly it should be realized that equipment size and capacity, e. g. heat exchanger capacity, etc., will vary with the rate of throughput. Also various changes, substitutions and modifications in carrying out the above process and in the deuterium concentration described may be made without departing from the spirit or scope of this invention. It is intended that the above description made with reference to the accompanying drawing be interpreted as illustrative and not in a limiting sense.

I claim:

1. The process of separating deuterium hydride from a gaseous mixture of nitrogen and hydrogen which comprises; subjecting a gaseous mixture of nitrogen and hydrogen in a weight ratio suitable for use in an ammonia synthesis reaction to low temperature fractionation in a first fractionation zone; recovering liquid nitrogen from the bottom of said first fractionation zone and recovering gaseous hydrogen overhead from said fractionation zone; returning said recovered gaseous hydrogen to an intermediate section of said first fractionation zone in indirect heat exchange relationship with the gaseous mixture of nitrogen and hydrogen therein; cooling by expansion said returned gaseous hydrogen; subjecting the resulting expanded gaseous hydrogen to fractionation within a second fractionation zone and recovering from the bottom of said second fractionation zone a deuterium hydride concentrate.

2. The process of separating deuterium hydride from a gaseous mixture of nitrogen and hydrogen which comprises; subjecting a gaseous mixture of nitrogen and hydrogen to low temperature fractionation in a first fractionation zone; recovering liquid nitrogen from the bottom of said fractionation zone and recovering gaseous hydrogen overhead from said fractionation zone; returning said recovered gaseous hydrogen to an intermediate section of said first fractionation zone in indirect heat exchange relationship with the gaseous mixture of nitrogen and hydrogen therein; cooling by expansion said returned gaseous hydrogen; subjecting the resulting expanded gaseous hydrogen to fractionation within a second fractionation zone; recovering overhead from said second fractionation zone gaseous hydrogen having a substantially reduced deuterium hydride content; admixing said gaseous hydrogen with said liquid nitrogen and recovering from the bottom of said second fractionation zone a deuterium hydride concentrate.

3. The process of claim 2 in which the admixture of gaseous hydrogen and liquid nitrogen is passed in indirect heat exchange relationship with said gaseous mixture of nitrogen and hydrogen.

4. The process of separating deuterium hydride from a gaseous mixture of nitrogen and hydrogen which comprises; subjecting a gaseous mixture of nitrogen and hydrogen in a weight ratio suitable for use in an ammonia synthesis reaction to low temperature fractionation in a first fractionation zone; recovering liquid nitrogen from the bottom of said first fractionation zone and recovering gaseous hydrogen overhead from said fractionation zone; recycling said recovered gaseous hydrogen to an intermediate section of said first fractionation zone in indirect heat exchange relationship with the gaseous mixture of nitrogen and hydrogen therein; cooling by expansion the recycled gaseous hydrogen; subjecting the resulting cooled, expanded recycled gaseous hydrogen to indirect heat exchange with hydrogen in the lower section of a second fractionation zone; passing the gaseous hydrogen from said indirect heat exchange into the upper section of said second fractionating zone and recovering from the bottom of said second fractionating zone a deuterium hydride concentrate.

5. The process of separating deuterium hydride from a gaseous mixture of nitrogen and hydrogen which comprises; subjecting a gaseous mixture of nitrogen and hydrogen in a weight ratio suitable for use in an ammonia synthesis reaction to low temperature fractionation in a first fractionation zone; recovering liquid nitrogen from the bottom of said first fractionation zone and recovering gaseous hydrogen overhead from said first fractionation zone; recycling said recovered gaseous hydrogen within an intermediate section of said first fractionation zone in indirect heat exchange relationship with the gaseous mixture of nitrogen and hydrogen therein; cooling by expansion said recycled gaseous hydrogen; subjecting the resulting cooled, expanded recycled gaseous hydrogen to indirect heat exchange with hydrogen in the lower section of a second fractionation zone; passing the gaseous hydrogen from said indirect heat exchange into the upper section of said second fractionation zone; admixing the gaseous hydrogen overhead from said second fractionation zone with the liquid nitrogen from said first fractionation zone and recovering from the bottom of said second fractionation zone a deuterium hydride concentrate.

6. The process of claim 5 in which the admixture of gaseous hydrogen and liquid nitrogen is passed in indirect heat exchange relationship with said gaseous mixture of nitrogen and hydrogen.

7. The process of separating deuterium hydride from a gaseous mixture of nitrogen and hydrogen which comprises; cooling a gaseous mixture of nitrogen and hydrogen at about normal atmospheric temperature and at a pressure of about 375 p. s. i. a., the weight ratio of nitrogen to hydrogen in said gaseous mixture being 4.64:1, in a first and a second heat exchange zone to about 70° K.; introducing the resulting cooled gaseous mixture into the lower section of a first fractionation zone, subjecting said gaseous mixture to fractionation within said first fractionation zone; recovering from the bottom of said first fractionation zone substantially pure liquid nitrogen at a temperature between about 63° K. and about 77° K. and recovering overhead from said first fractionation zone gaseous hydrogen at a temperature of about 41° K.; recycling said gaseous hydrogen to a third heat exchange zone located in an intermediate section of said first fractionation zone; cooling and expanding said gaseous hydrogen from said third heat exchange zone to a temperature about 31° K. and at a pressure about 67 p. s. i. a.; further cooling the resulting cooled and expanded gaseous hydrogen to about 28° K. within a fourth heat exchange zone; further cooling the resulting cooled gaseous hydrogen from said fourth heat exchange zone to about 27° K. in a fifth heat exchange zone located in the lower section of a second fractionation zone; cooling the resulting cooled liquid hydrogen from said fifth heat exchange zone in a sixth heat exchange zone to a temperature of about 25° K.; cooling and expanding the hydrogen gas from said sixth heat exchange zone to a temperature about 21.7° K. and a pressure about 22 p. s. i. a. into the upper section of said second fractionation zone; subjecting said hydrogen gas to fractionation within said second fractionation zone; recovering from the bottom of said second fractionation zone a deuterium hydride concentrate at a temperature of about 25.1° K.; recovering overhead from said second fractionation zone gaseous hydrogen having a substantially reduced deuterium hydride content and at a temperature of about 21.7° K.; subjecting said recovered gaseous hydrogen to countercurrent heat exchange within said sixth and said fourth heat exchange zone successively, respectively, to increase the temperature of said recovered gaseous hydrogen to about 29° K.; increasing the temperature of said recovered gaseous hydrogen to about 65° K. by heat exchange within a seventh and an eighth heat exchange zone successively, respectively, located in the upper and lower sections of said first fractionation zone; increasing the temperature of this same gaseous hydrogen to about 86.2° K. by countercurrent, indirect heat exchange relationship within a ninth heat exchange zone; further increasing the temperature of this same gaseous hydrogen to about 60° F. by countercurrent indirect heat exchange relationship within said first heat exchange zone; compressing and cooling this same gaseous hydrogen to about 80° F. and at a pressure of about 325 p. s. i. a.; cooling the compressed gaseous hydrogen to about 91.8° K. by countercurrent indirect heat exchange within said first heat exchange zone; further cooling this same gaseous hydrogen to a temperature of about 73.5° K. by countercurrent indirect heat exchange within said ninth heat exchange zone; admixing this same gaseous hydrogen with the liquid nitrogen from said first fractionating zone and expanding and cooling the admixture to produce a combined nitrogen-hydrogen stream at a temperature about 67.1° K. and at a pressure about 275 p. s. i. a.; increasing the temperature of said nitrogen hydrogen stream to about 89.4° K. by countercurrent indirect heat exchange relationship within said second heat exchange zone and further increasing the temperature of said nitrogen-hydrogen stream to about 60° F. by countercurrent indirect heat exchange relationship within said first heat exchange zone.

8. An apparatus for the low temperature fractionation of a gaseous mixture of nitrogen and hydrogen comprising, in combination, a fractionator; a first heat exchange means within the upper section of said fractionator; a second heat exchange means within the lower section of said fractionator; a third heat exchange means intermediate said first and second heat exchange means within said fractionator; a conduit connecting said first and second heat exchange means; an inlet located in the lower section of said fractionator; an outlet located in the upper section of said fractionator; an outlet located in the lower section of said fractionator; and a conduit connecting said upper outlet and said third heat exchange means.

9. The process of separating deuterium hydride from a gaseous mixture of nitrogen and hydrogen which comprises subjecting a gaseous mixture of nitrogen and hydrogen in a weight ratio suitable for use in an ammonia synthesis reaction to low temperature fractionation in a first fractionation zone; recovering liquid nitrogen from the bottom of said fractionation zone and recovering gaseous hydrogen overhead from said first fractionation zone; recycling said recovered gaseous hydrogen within an intermediate section of said first fractionation zone in indirect heat exchange relationship with the gaseous mixture of nitrogen and hydrogen therein; cooling by expansion said recycled gaseous hydrogen; subjecting the resulting cooled, expanded recycled gaseous hydrogen to indirect heat exchange with hydrogen in the lower section of a second fractionation zone; passing the gaseous hydrogen from said last mentioned indirect heat exchange into the upper section of said second fractionation zone; recovering from the bottom of said second fractionation zone a deuterium hydride concentrate; recovering overhead gaseous hydrogen from said second fractionation zone; passing said recovered gaseous hydrogen through an upper section and then through a lower section of said first fractionation zone in indirect heat exchange relationship with the gaseous mixture of nitrogen and hydrogen therein; admixing said recovered gaseous hydrogen with the liquid nitrogen from said first fractionation zone; and passing the resulting admixture in indirect heat exchange relationship with said gaseous mixture.

10. The process of separating deuterium hydride from a gaseous mixture of nitrogen and hydrogen which comprises subjecting a gaseous mixture of nitrogen and hydrogen to low temperature fractionation in a first fractionation zone; recovering liquid nitrogen from the bottom of said first fractionation zone and recovering gaseous hydrogen overhead from said fractionation zone; returning said recovered gaseous hydrogen to an intermediate section of said first fractionation zone in indirect heat exchange relationship with the gaseous mixture of nitrogen and hydrogen therein; cooling by expansion said returned gaseous hydrogen; subjecting the resulting expanded gaseous hydrogen to fractionation within a second fractionation zone; and recovering from the bottom of said second fractionation zone a deuterium hydride concentrate.

References Cited in the file of this patent

UNITED STATES PATENTS

| | | |
|---|---|---|
| 1,511,800 | Claude | Oct. 19, 1924 |
| 1,619,909 | Wilkinson | Mar. 8, 1927 |
| 1,620,192 | Claude | Mar. 8, 1927 |
| 1,664,412 | Haynes | Apr. 3, 1928 |
| 1,723,425 | Jaubert | Aug. 6, 1929 |
| 1,810,312 | Hasche | June 16, 1931 |
| 2,258,015 | Keith | Oct. 7, 1941 |
| 2,502,251 | Dennis | Mar. 28, 1950 |
| 2,534,903 | Etienne | Dec. 19, 1950 |
| 2,548,032 | Little | Apr. 10, 1951 |
| 2,573,341 | Kniel | Oct. 30, 1951 |
| 2,587,820 | Cartier | Mar. 4, 1952 |
| 2,598,785 | Groebe | June 3, 1952 |
| 2,600,110 | Hachmuth | June 10, 1952 |